United States Patent
Hwang et al.

(10) Patent No.: US 11,447,176 B2
(45) Date of Patent: Sep. 20, 2022

(54) SYSTEM AND METHOD FOR DETECTING HANDS-OFF STATE OF STEERING WHEEL

(71) Applicants: HYUNDAI MOTOR COMPANY, Seoul (KR); KIA MOTORS CORPORATION, Seoul (KR)

(72) Inventors: Dong Hyun Hwang, Sejong-si (KR); Jin Hyuck Heo, Seoul (KR); Kyu Won Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 126 days.

(21) Appl. No.: 16/588,397

(22) Filed: Sep. 30, 2019

(65) Prior Publication Data

US 2020/0353978 A1 Nov. 12, 2020

(30) Foreign Application Priority Data

May 8, 2019 (KR) .................... 10-2019-0053589

(51) Int. Cl.
*B62D 6/10* (2006.01)
*B60W 40/08* (2012.01)
(Continued)

(52) U.S. Cl.
CPC .............. *B62D 6/10* (2013.01); *B60W 10/20* (2013.01); *B60W 40/08* (2013.01); *B60W 50/08* (2013.01);
(Continued)

(58) Field of Classification Search
CPC ......... B62D 6/10; B60W 10/20; B60W 40/08; B60W 2050/007; B60W 2510/202; B60W 2510/205
See application file for complete search history.

(56) References Cited

U.S. PATENT DOCUMENTS

| 8,095,271 B2 | 1/2012 | Lee |
| 2017/0203788 A1* | 7/2017 | Heo ..................... B62D 15/021 |

(Continued)

FOREIGN PATENT DOCUMENTS

KR 10-2018-0069504 A 6/2018

*Primary Examiner* — Tyler J Lee
*Assistant Examiner* — Yufeng Zhang
(74) *Attorney, Agent, or Firm* — Morgan, Lewis & Bockius LLP

(57) ABSTRACT

A system and method for detecting a hands-off state of a steering wheel may include acquiring, by a controller, a steering torque, a steering angle and a steering angular speed while driving of a vehicle, determining, by the controller, a variance value of the steering angular speed through cumulation for a designated time, determining, by the controller, a difference value between a steering angular speed estimated through a steering system model determined on an assumption that the steering wheel is in the hands-off state and a measured steering angular speed through cumulation for a designated time, when the variance value of the steering angular speed is less than a first threshold value, and divisionally determining, by the controller, whether or not the steering wheel is in the hands-off state or in the hands-on state according to the difference value between the measured and estimated steering angular speeds.

16 Claims, 7 Drawing Sheets

(51) Int. Cl.
*B60W 50/08* (2020.01)
*B60W 10/20* (2006.01)
*B60W 50/00* (2006.01)

(52) U.S. Cl.
CPC . *B60W 2050/007* (2013.01); *B60W 2510/202* (2013.01); *B60W 2510/205* (2013.01)

(56) References Cited

U.S. PATENT DOCUMENTS

| | | | |
|---|---|---|---|
| 2019/0286134 A1* | 9/2019 | Niesen | B62D 15/025 |
| 2019/0331544 A1* | 10/2019 | Kojo | B62D 15/025 |
| 2019/0382048 A1* | 12/2019 | Sawada | B62D 15/025 |
| 2020/0216079 A1* | 7/2020 | Mahajan | B60W 40/09 |

* cited by examiner

SYSTEM AND METHOD FOR DETECTING HANDS-OFF STATE OF STEERING WHEEL

CROSS-REFERENCE TO RELATED APPLICATION

The present application claims priority to Korean Patent Application No. 10-2019-0053589, filed on May 8, 2019 in the Korean Intellectual Property Office, the entire contents of which is incorporated herein for all purposes by this reference.

BACKGROUND OF THE INVENTION

Field of the Invention

The present invention relates to a system and method for detecting a hands-off state of a steering wheel in which indirect hands-on/off detection logic is improved and thus hands-on/off detection performance is improved.

Description of Related Art

In some autonomous driving modes in which a driving state of a vehicle is controlled to prevent driveway and lane departure, an autonomous driving mode is executed only in a hands-on state in which a driver grasps a steering wheel, a warning about a hands-off situation is provided and then the corresponding autonomous driving mode is turned off in a hands-off state in which the driver takes his or her hands off the steering wheel, and thus it is necessary to detect the hands-off state of the steering wheel.

A steering sensor provided in a motor driven power steering (MDPS) system is configured to measure steering torque of a steering wheel, and whether or not a driver grasps the steering wheel using such a steering sensor may be indirectly determined.

That is, if the driver grasps the steering wheel and if the driver takes his or her hands off the steering wheel, different torque fluctuations are detected, and thus, the hands-on state of the steering wheel (in a state in which the driver grasps the steering wheel with his or her hands) and the hands-off state of the steering wheel (in a state in which the driver takes his or her hands off the steering wheel) may be determined based on such a torque fluctuation difference.

For example, if an amount of torque fluctuation detected by the steering sensor is within a designated torque fluctuation section, such a state is determined as the hands-off state.

However, in a case of the above-described technology which indirectly determines the hands-on/off states, when the vehicle is driven on a rough road surface, noise is generated due to reaction force to the road surface, such noise causes torque change and increases an amount of torque fluctuation, and thereby, the hands-off state may be falsely determined as the hands-on state.

Furthermore, if the driver grasps left and right equal positions of the steering wheel using both hands or if the driver weakly grasps the steering wheel, a magnitude of torque is small and an amount of torque fluctuation is small, and thus, the hands-on state may be falsely determined as the hands-off state.

As a method for directly determining the hands-on or hands-off state of a steering wheel, a sensor may be mounted in the steering wheel to determine whether or not a driver grasps the steering wheel.

However, if the driver grasps a region of the steering wheel in which the sensor is not mounted, it is difficult to determine the hands-on state, and, if the driver places only one finger on the steering wheel or the driver puts on gloves and thus change in permittivity is small, it is difficult to determine the hands-on state.

Furthermore, the above sensor may determine only whether or not the driver grasps the steering wheel, and, to determine grip strength of the driver's hands on the steering wheel, a plurality of sensors may be additionally mounted and thus manufacturing costs of the steering wheel are increased.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a system and method for detecting a hands-off state of a steering wheel in which indirect hands-on/off detection logic is improved and thus hands-on/off detection performance is improved.

In accordance with an aspect of the present invention, the above and other objects may be accomplished by the provision of a method for detecting a hands-off state of a steering wheel, including acquiring, by a controller, a steering torque, a steering angle and a steering angular speed while a vehicle is driven; determining, by the controller, a variance value of the steering angular speed through cumulation for a designated time; determining, by the controller, a difference value between a steering angular speed estimated through a steering system model determined on an assumption that the steering wheel is in the hands-off state and an steering angular speed measured by a steering sensor through cumulation for a designated time, when the variance value of the steering angular speed is less than a first threshold value; and divisionally determining, by the controller, whether or not the steering wheel is in the hands-off state or in the hands-on state according to the difference value between the measured and estimated steering angular speeds.

In divisionally determining whether or not the steering wheel is in the hands-off state or in the hands-on state according to the difference value between the measured and estimated steering angular speeds, the controller may be configured to determine that the steering wheel is in the hands-off state, when the difference value between the measured and estimated steering angular speeds is less than a second threshold value, and determine that the steering wheel is in the hands-on state, when the difference value between the measured and estimated steering angular speeds is not less than the second threshold value.

The method may further include determining, by the controller, whether or not the difference value between the measured and estimated steering angular speeds is maintained for a designated time or longer.

The variance value of the steering angular speed may be determined by Equation 1 below.

$$v_\theta = \frac{\sum_{i=n}^{n-N}(\dot{\theta}_i - \overline{\dot{\theta}})^2}{N} \qquad \text{[Equation 1]}$$

$v_\theta$: the variance value of the steering angular speed
$\dot{\theta}$: the steering angular speed
$\bar{\dot{\theta}}$: average of the steering angular speed
N: test time The difference value between the measured and estimated steering angular speeds may be determined by Equation 2 below.

$$\sum_{i=n}^{n-N} \left( \dot{\theta}_{h,i(model)} - \dot{\theta}_{h,i(measure)} \right)^2 \qquad [\text{Equation 2}]$$

$\dot{\theta}_{h,i(model)}$: the steering angular speed estimated through the steering system model determined on an assumption that the steering wheel thereof is in the hands-off state $\dot{\theta}_{h,i(measure)}$: the steering angular speed measured by the steering sensor The steering angular speed estimated through the steering system model may be determined by setting up an equation of motion of the steering system model having the steering wheel provided at an upper end portion of a torsion bar, determined on an assumption that the steering wheel is in the hands-off state; setting up equations of state using the steering angle and the steering angular speed as quantities of state from the equation of motion; and determining the steering angular speed of the hands-off state from the equations of state.

The method may further include determining, by the controller, a variance value of the steering torque through cumulation for a designated time, when the variance value of the steering angular speed is not less than the first threshold value; and divisionally determining, by the controller, whether or not the steering wheel is in the hands-off state or in the hands-on state according to the variance value of the steering torque.

In divisionally determining whether or not the steering wheel is in the hands-off state or in the hands-on state according to the variance value of the steering torque, the controller may be configured to determine that the steering wheel is in the hands-off state, when the variance value of the steering torque is less than a third threshold value, and determine that the steering wheel is in the hands-on state, when the variance value of the steering torque is not less than the third threshold value.

The method may further include determining, by the controller, whether or not the variance value of the steering torque is maintained for a designated time or longer.

The variance value of the steering torque may be determined by Equation 3 below.

$$v_r = \frac{\sum_{i=n}^{n-N} (\tau_i - \bar{\tau})^2}{N} \qquad [\text{Equation 3}]$$

$V_\tau$: the variance value of the steering torque
$\tau$: the steering torque
$\bar{\tau}$: torque average
N: test time.

The method may further include determining, by the controller, whether or not a current driving mode of the vehicle is in an autonomous driving mode; and giving a warning about the hands-off state upon determining that the current driving mode of the vehicle is in the autonomous driving mode, upon determining that the steering wheel is in the hands-off state.

In accordance with another aspect of the present invention, there is provided a system of detecting a hands-off state of a steering wheel, including a steering angular speed variance calculation unit configured to determine a variance value of a steering angular speed, detected by a steering sensor while driving of a vehicle, through cumulation for a designated time; a steering angular speed estimation unit configured to estimate a steering angular speed through a steering system model determined on an assumption that the steering wheel is in the hands-off state; a steering angular speed difference calculation unit configured to determine a difference value between the steering angular speed estimated through the steering system model and the steering angular speed measured by the steering sensor through cumulation for a designated time, when the variance value of the steering angular speed is not less than a first threshold value; and a hands-on/off determination unit configured to divisionally determine the hands-off state or the hands-on state of the steering wheel according to the difference value between the measured and estimated steering angular speeds.

The system may further include a steering torque variance calculation unit configured to determine a variance value of the steering torque through cumulation for a designated time, when the variance value of the steering angular speed is less than the first threshold value; and the hands-on/off determination unit may divisionally determine the hands-off state or the hands-on state of the steering wheel according to the variance value of the steering torque.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
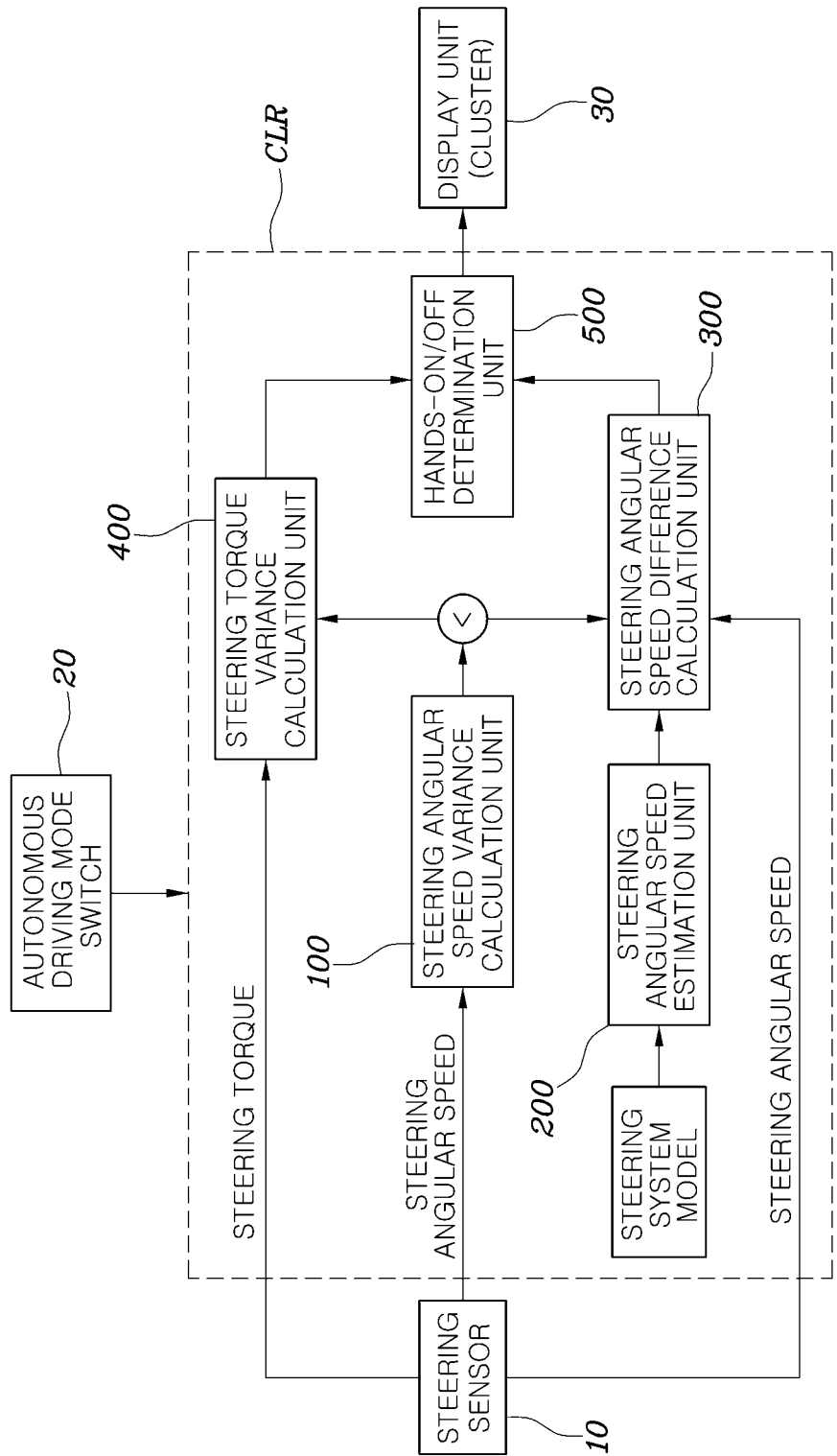
FIG. 1 is a block diagram illustrating a system of detecting a hands-off state of a steering wheel in accordance with various aspects of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts.

FIG. 1 is a block diagram illustrating a system of detecting a hands-off state of a steering wheel which is applicable to the present invention, and the hands-on/off states of the steering wheel are detected using steering information measured by a steering sensor 10.

For the present purpose, the steering sensor 10 in accordance with various aspects of the present invention may employ a steering sensor which may measure a steering angle and steering torque, for example, a torque angle sensor (TAS) applied to a motor driven power steering (MDPS) system.

Also, in an exemplary embodiment of the present invention, an autonomous driving mode switch 20 through which a driver may operate and select an autonomous driving mode may be provided.

Therefore, when the vehicle is driven at a designated speed or higher, if the driver turns on the autonomous driving mode switch 20, the vehicle may be driven in the autonomous driving mode and, at the same time, hands-off detection logic of the present invention may be executed, thus detecting the hands-off state of the steering wheel.

To implement such a hands-off state detection function, the system in accordance with various aspects of the present invention may include a steering angular speed variance calculation unit 100, a steering angular speed estimation unit 200, a steering angular speed difference calculation unit 300 and a hands-on/off determination unit 500, and these units may be included in a controller CLR.

Referring to FIG. 1, the steering angular speed variance calculation unit 100 determines a variance value of the steering angular speed, detected by the steering sensor 10 while driving of the vehicle, through cumulation for a designated time.

Furthermore, the steering angular speed estimation unit 200 estimates a steering angular speed through a steering system model determined on an assumption that the steering wheel is in the hands-off state.

Here, the steering system model may be a model, and the upper end part of which is related to the steering wheel provided at the upper end portion of a torsion bar is mathematically expressed for the model.

Furthermore, the steering angular speed difference calculation unit 300 determines a difference value between the steering angular speed estimated through the steering system model and the steering angular speed measured by the steering sensor 10 through cumulation for a designated time, when the variance value of the steering angular speed is not less than a first threshold value.

The hands-on/off determination unit 500 divisionally determines the hands-off state or the hands-on state of the steering wheel according to the difference value between the measured and estimated steering angular speeds.

As a result of determination, if the hands-on/off determination unit 500 determines that the steering wheel is in the hands-off state, whether or not the vehicle is currently driven in the autonomous driving mode is determined according to a signal transmitted from the autonomous driving mode switch 20, and a warning that the steering wheel is in the hands-off state is issued or displayed through a cluster or a speaker, upon determining that the vehicle is currently driven in the autonomous driving mode.

Furthermore, the system in accordance with various aspects of the present invention may further include a steering torque variance calculation unit 400 which determines a variance value of the steering torque through cumulation for a designated time, when the variance value of the steering angular speed is less than the first threshold value.

Therefore, the hands-on/off determination unit 500 divisionally determines the hands-off state or the hands-on state of the steering wheel according to the variance value of the steering torque.

The controller CLR in accordance with various exemplary embodiments of the present invention may be implemented through a processor configured to perform an operation which will be described below, using an algorithm configured to control operations of various components of the vehicle or a non-volatile memory configured to store data regarding software commands to reproduce the algorithm and the data stored in the corresponding memory. Here, the memory and the processor may be implemented as separate chips. Alternatively, the memory and the processor may be implemented as one integrated chip. One or more processors may be provided.

The system in accordance with various aspects of the present invention determines whether or not the steering wheel is in the hands-on state or the hands-off state using steering information measured by the steering sensor 10 and steering information determined using the steering system model according to the driving state of the vehicle through the above-described controller CLR.

Referring to FIGS. 1 and 3, a method for detecting a hands-off state of a steering wheel in accordance with various aspects of the present invention will be described. First, the controller CLR detects steering torque, a steering angle and a steering angular speed while driving of the vehicle.

For example, the steering torque and the steering angle may be measured by the steering sensor 10, and the steering angular speed may be determined by differentiating the steering angle.

Thereafter, the controller CLR may determine a variance value of the steering angular speed through cumulation for a designated time.

Here, the variance value of the steering angular speed may be determined by Equation 1 below.

$$v_\theta = \frac{\sum_{i=n}^{n-N}(\dot{\theta}_i - \overline{\dot{\theta}})^2}{N}$$ [Equation 1]

$v_\theta$: a variance value of steering angular speed
$\dot{\theta}$: a steering angular speed
$\overline{\dot{\theta}}$: average of the steering angular speed
N: test time That is, if a driver changes a direction of the steering wheel, or the vehicle enters into a rough road surface and thus vibration of the steering wheel is generated, a cumulative variance value of the steering angular speed is increased.

However, since a variance value of the steering angular speed determined if the driver changes a steering direction in the hands-on state of the steering wheel is greater than a variance value of the steering angular speed determined if the vehicle is driven on a rough road surface in the hands-off state of the steering wheel, whether or not the steering wheel is currently in the hands-on state or in the hands-off state may be temporarily determined according to the variance value of the steering angular speed.

Thereafter, when the variance value of the steering angular speed is less than a first threshold value, the controller CLR determines a difference value between a steering angular speed estimated through the steering system model determined on an assumption that the steering wheel thereof is in the hands-off state and a steering angular speed measured by the steering sensor 10 through cumulation for a designated time.

Here, the difference value between the measured and estimated steering angular speeds may be determined by Equation 2 below.

$$\sum_{i=n}^{n-N}(\dot{\theta}_{h,i(model)} - \dot{\theta}_{h,i(measure)})^2$$ [Equation 2]

$\dot{\theta}_{h,i(model)}$: a steering angular speed estimated through the steering system model determined on an assumption that the steering wheel thereof is in the hands-off state
$\dot{\theta}_{h,i(measure)}$: a steering angular speed measured by the steering sensor Now, a method for estimating the steering angular speed through the steering system model will be described. As exemplarily shown in FIG. 2, on an assumption that the steering wheel of the steering system model is in the hands-off state, an equation of motion of the steering system model in which a steering wheel is provided at the upper end portion of a torsion bar is set upwards. upwards.

Figure 2:
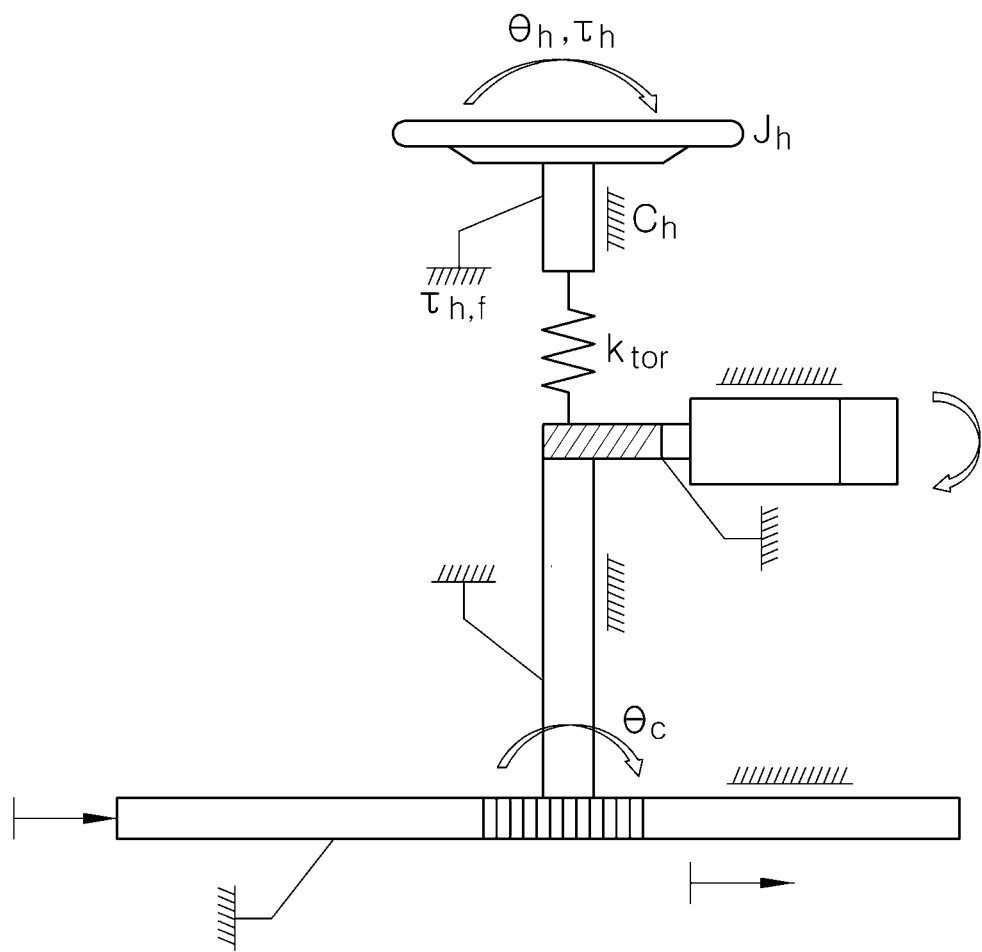
FIG. 2 is a view exemplarily illustrating a steering system model applied to the present invention.

For the present purpose, the upper end portion of the steering system model related to the steering wheel shown in FIG. 2 will be expressed as a mathematical model by Equation 2.1 below.

$$J_h\ddot{\theta}_h + C_h\dot{\theta}_h + k_{tor}(\theta_h - \theta_c) + \tau_{h,f}\operatorname{sgn}(\dot{\theta}_h) = \tau_h$$ [Equation 2.1]

$J_h$: inertia of the steering wheel
$C_h$: damping of the steering wheel
$\theta_h$: a measured steering angle value
$\theta_c$: a column angle
$\tau_h$: driver's steering torque
$\tau_{sensor}$: a measured steering torque value
$\tau_{h,f}$: frictional force of the steering wheel
$k_{tor}$: rigidity of the torsion bar
$T_s$: sampling time
$\tau_{h,f}\operatorname{sgn}(\dot{\theta}_h)$: modeling formula with respect to frictional force of the steering wheel Here, since the torque value $\tau_{sensor}$ measured by the steering sensor 10 may be substituted for a magnitude $k_{tor}(\theta_h - \theta_c)$ of torque applied to the torsion bar and the frictional force of the steering wheel is very small and thus ignorable, Equations 2.2 below may be expressed.

$$\tau_{sensor} = k_{tor}(\theta_h - \theta_c)$$

$$J_h\ddot{\theta}_h + C_h\dot{\theta}_h + \tau_{sensor} = \tau_h$$ [Equations 2.2]

Furthermore, on an assumption that torque applied by the driver is 0 ($\tau_h = 0$) in the hands-off state of the steering wheel, an equation of motion of the steering system model in the hands-off state of the steering wheel may be acquired as Equation 2.3 below.

$$J_h\ddot{\theta}_h + C_h\dot{\theta}_h + \tau_{sensor} = 0$$ [Equation 2.3]

Thereafter, equations of state in which the steering angle and the measured and estimated steering angular speeds are used as quantities of state are set up as Equations 2.4 below.

$$\ddot{\theta}_h = -\frac{C_h}{J_h}\dot{\theta}_h + \tau_{sensor}$$ [Equation 2.4]

$$\dot{X} = AX + Bu$$

$$A = \begin{bmatrix} -\frac{C_h}{J_h} & 0 \\ 1 & 0 \end{bmatrix}, B = \begin{bmatrix} -\frac{1}{J_h} \\ 0 \end{bmatrix}, X = \begin{bmatrix} \dot{\theta}_h \\ \theta_h \end{bmatrix}, u = \tau_{sensor}$$

$$\begin{bmatrix} \dot{\theta}_{h,i+1} \\ \theta_{h,i+1} \end{bmatrix} = \begin{bmatrix} 1 - T_s\frac{C_h}{J_h} & 0 \\ T_h & 0 \end{bmatrix}\begin{bmatrix} \dot{\theta}_{h,i} \\ \theta_{h,i} \end{bmatrix} + \begin{bmatrix} -\frac{T_s}{J_h} \\ 0 \end{bmatrix}\tau_{sensor}$$

Accordingly, the steering angular speed of the steering wheel in the hands-off state is determined from the equations of state expressed as Equations 2.4.

That is, a difference between the estimated steering angular speed determined through the steering system model determined on an assumption that the steering wheel thereof is in the hands-off state and the steering angular speed actually measured in the hands-off state of the steering wheel is insignificant, but a difference between the estimated steering angular speed and a steering angular speed measured in the hands-on state of the steering wheel is great because the steering system model is determined on an assumption that the steering wheel thereof is in the hands-off state.

Therefore, the controller CLR may divisionally determine the hands-off state or the hands-on state of the steering wheel according to the difference value between the measured and estimated steering angular speeds determined by Equation 2 above $\sum_{i=n}^{n-N}(\dot{\theta}_{h,i(model)} - \dot{\theta}_{h,i(measure)})^2$.

For example, if the difference value between the measured and estimated steering angular speeds is less than a second threshold value, the difference between the estimated steering angular speed value determined through the steering system model determined on an assumption that the steering wheel thereof is in the hands-off state and the actually measured steering angular speed is small, and thus it is determined that the steering wheel is in the hands-off state.

On the other hand, if the difference value between the measured and estimated steering angular speeds is not less than the second threshold value, the difference between the estimated steering angular speed value determined through the steering system model determined on an assumption that the steering wheel thereof is in the hands-off state and the actually measured steering angular speed is great, and thus it is determined that the steering wheel is in the hands-on state.

Here, since a designated time is required to determine the estimated steering angular speed value, the difference value cumulated for a sampling time N may be compared to the second threshold value.

Furthermore, when whether or not the steering wheel is in the hands-off state or the hands-on state is determined, whether or not the difference value between the measured and estimated steering angular speeds is maintained for a designated time or longer may be further determined.

For example, if the difference value between the measured and estimated steering angular speeds is less than the second threshold value, whether or not a state in which the difference value between the measured and estimated steering angular speeds is less than the second threshold value is maintained for a designated time or longer may be further determined, and, upon determining that the state is maintained for the designated time or longer, it may be finally determined that the steering wheel is in the hands-off state.

Of course, even if the difference value between the measured and estimated steering angular speeds is not less than the second threshold value, whether or not a state in which the difference value between the measured and estimated steering angular speeds is not less than the second threshold value is maintained for a designated time or longer may be further determined, and, upon determining that the state is maintained for the designated time or longer, it may be finally determined that the steering wheel is in the hands-on state.

That is, by finally determining that the steering wheel is in the hands-on state or in the hands-off state if the same detection result is maintained for a designated time, frequent change in detection of the hands-off state when disturbance occurs is suppressed and thus robustness of the hands-off detection logic is improved.

Figure 4:
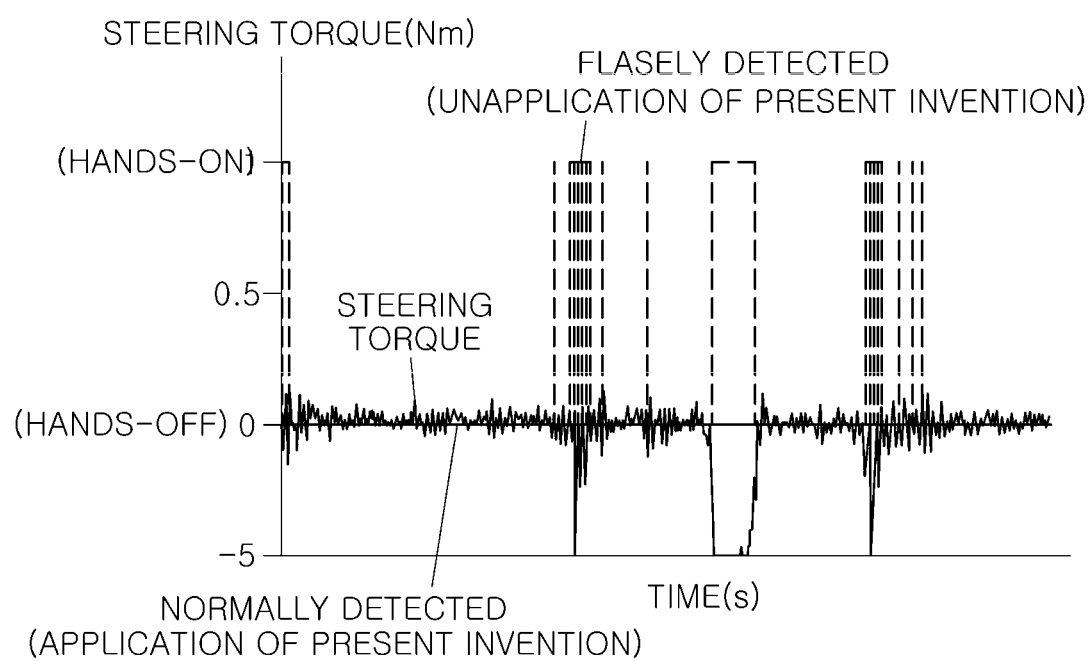
FIG. 4 is a graph representing detection results of the hands-on/off states of the steering wheel before and after application of the system and method in accordance with various aspects of the present invention, when a vehicle is driven on a rough road in the hands-off state of the steering wheel.

FIG. 4 is a graph representing detection results of the hands-off state of the steering wheel, if the vehicle is driven on a rough road in the hands-off state of the steering wheel.

Before application of the present invention, when noise of a designated value or more is generated from the steering sensor 10 due to the rough road surface, the hands-off state may be falsely detected as the hands-on state.

However, after application of the present invention, even if steering torque is generated by reaction force to the road surface (①), the steering angular speed changed according to physical relations compensates for the steering torque (②), as stated in Equation 2.5 below derived from Equation 2.4. Therefore, it may be confirmed that, even if steering torque caused by the rough road surface is generated, the hands-off state may be normally detected.

$$\dot{\theta}_{h,i+1} = \overbrace{\left(1 - T_s \frac{C_1}{J_1}\right)\dot{\theta}_{h,i}}^{②} - \overbrace{\frac{T_s}{J_1}\tau_{sensor}}^{①}$$ [Equation 2.5]

$\frac{C_1}{J_1}$:

damping of the steering wheel/inertia of the steering wheel

In an exemplary embodiment of the present invention, when the variance value of the steering angular speed is not less than the first threshold value, a variance value of the steering torque is determined through cumulation for a designated time.

Here, the variance value of the steering torque may be determined by Equation 3 below.

$$v_\tau = \frac{\sum_{i=n}^{n-N}(\tau_i - \overline{\tau})^2}{N}$$ [Equation 3]

$V_\tau$: a variance value of the steering torque
$\tau$: steering torque
$\overline{\tau}$: torque average
N: test time.

That is, when the vehicle is driven straight, if the driver places one hand at a six o'clock position of the steering wheel or places both hands at left and right equal positions of the steering wheel, the size of steering information and change in the steering information detected by the steering sensor 10 are insignificant, and thus it may be difficult to detect the hands-off state.

Therefore, when the variance value of the steering torque may be determined by Equation 3 above, a big difference between the hands-on state and the hands-off state occurs.

Accordingly, the hands-off state or the hands-on state of the steering wheel may be divisionally determined according to the variance value of the steering torque determined by Equation 3 above.

For example, if the variance value of the steering torque is less than a third threshold value, it is determined that the steering wheel is in the hands-off state. That is, since, in the hands-off state of the steering wheel, the driver does not grasp the steering wheel, the determined variance value of the steering torque is not great.

On the other hand, if the variance value of the steering torque is not less than the third threshold value, the drive grasps the steering wheel, the determined variance value of the steering torque is relatively great, and thus it is determined that the steering wheel is in the hands-on state.

Here, the hands-on state or the hands-off state of the steering wheel may be detected by comparing a variance value of a cumulative torque value measured for a sampling time N with the third threshold value.

Furthermore, when whether or not the steering wheel is in the hands-off state or the hands-on state is determined, whether or not the variance value of the steering torque is maintained for a designated time of longer may be further determined.

For example, if the variance value of the steering torque is less than the third threshold value, whether or not a state in which the variance value of the steering torque is less than the third threshold value is maintained for a designated time or longer may be further determined, and, upon determining that the state is maintained for the designated time or longer, it may be finally determined that the steering wheel is in the hands-off state.

Of course, even if the variance value of the steering torque is not less than the third threshold value, whether or not a state in which the variance value of the steering torque is not less than the third threshold value is maintained for a designated time or longer may be further determined, and, upon determining that the state is maintained for the designated time or longer, it may be finally determined that the steering wheel is in the hands-on state.

Figure 5:
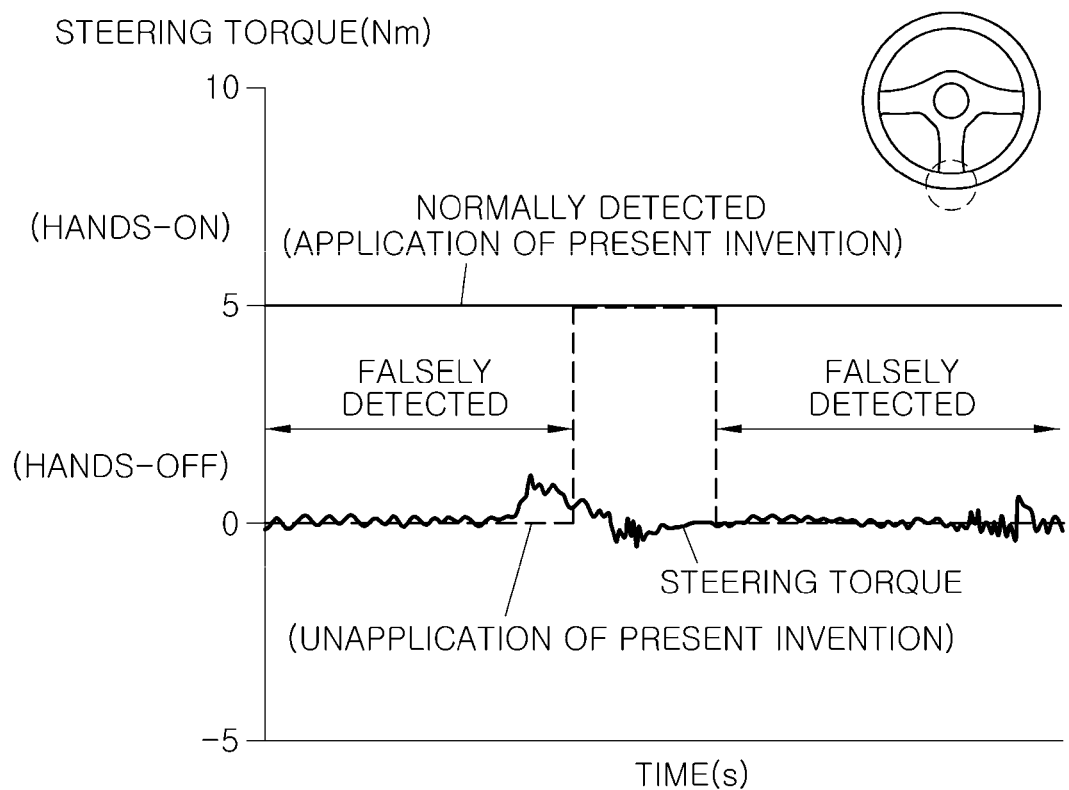
FIG. 5 is a graph representing detection results of the hands-on/off states of the steering wheel before and after application of the system and method in accordance with various aspects of the present invention, when the vehicle is driven in a state in which a driver places one hand at a position of the steering wheel.
Figure 6:
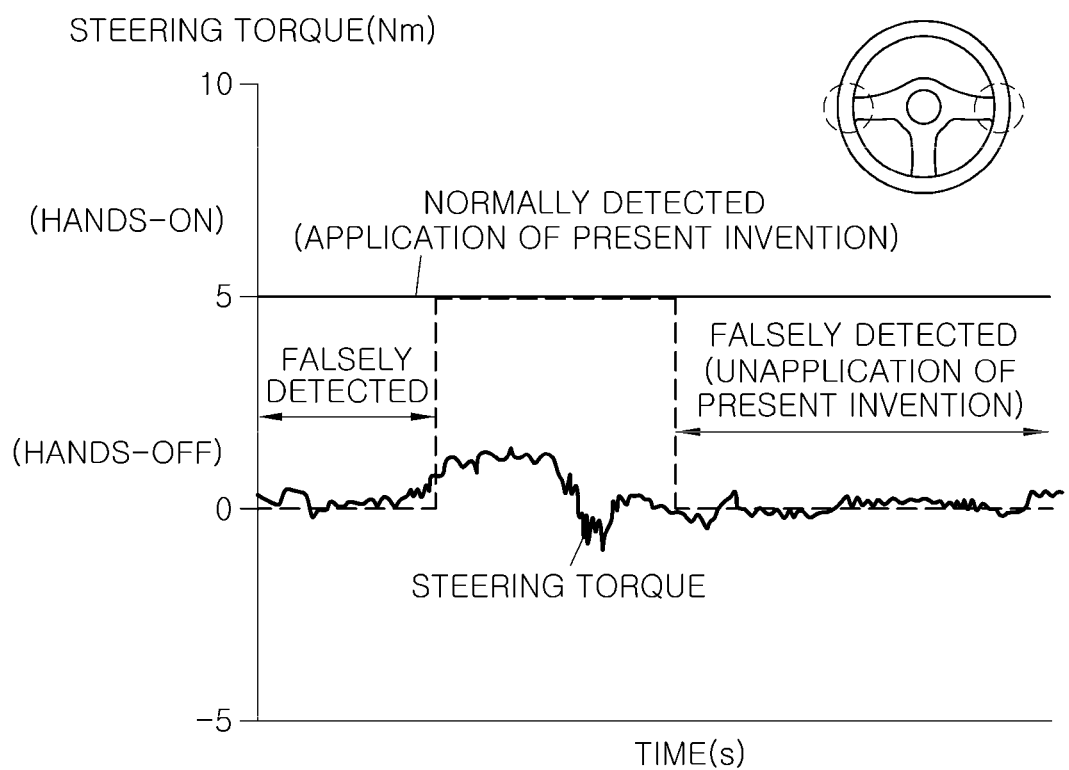
FIG. 6 is a graph representing detection results of the hands-on/off states of the steering wheel before and after application of the system and method in accordance with various aspects of the present invention, when the vehicle is driven in a state in which the driver places both hands at left and right equal positions of the steering wheel.

FIG. 5 and FIG. 6 are graphs illustrating detection results of the hands-off state of the steering wheel, if a driver places one hand at a six o'clock position of the steering wheel or places both hands at left and right equal positions of the steering wheel, when the vehicle is driven straight.

Before application of the present invention, even if the driver grasps the steering wheel, a steering torque is too small and thus the hands-on state may be falsely detected as the hands-off state.

However, after application of the present invention, it may be confirmed that, even if steering torque is small, variance of the steering torque is applied, a variance value of the steering torque is large and thus the hands-on state may be normally detected.

Furthermore, in an exemplary embodiment of the present invention, the controller CLR may determine whether or not a current driving mode is the autonomous driving mode by detecting a signal transmitted by the autonomous driving mode switch 20.

Thereafter, upon determining that the current driving mode is the autonomous driving mode, upon determining that the steering wheel is in the hands-off state, a warning that the steering wheel is in the hands-off state may be provided through a display unit 30, such as the cluster of the vehicle.

Figure 3A:
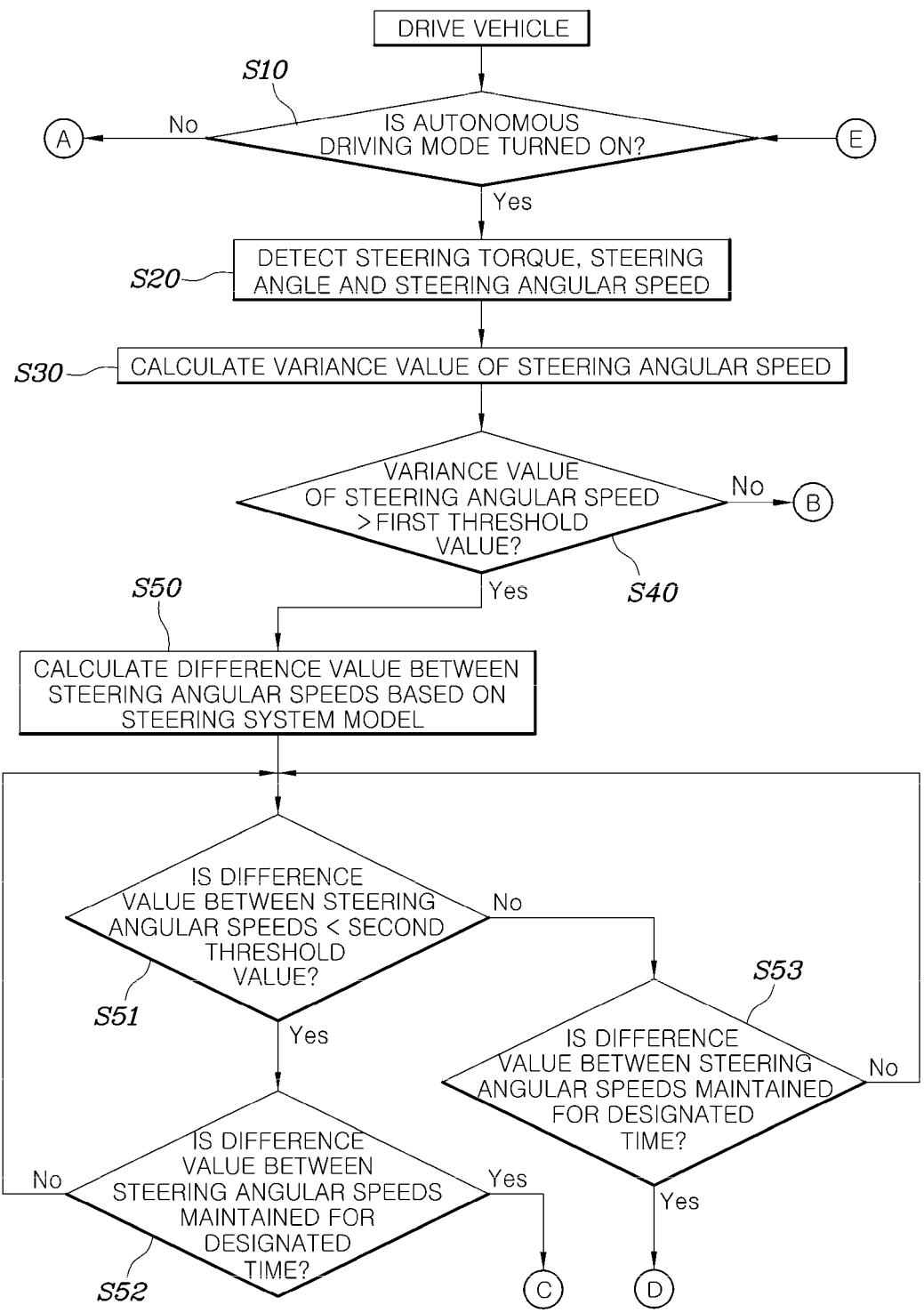
FIGS. 3A and 3B are flowcharts illustrating an overall control flow of a method for detecting a hands-off state of a steering wheel in accordance with various aspects of the present invention.
Figure 3B:
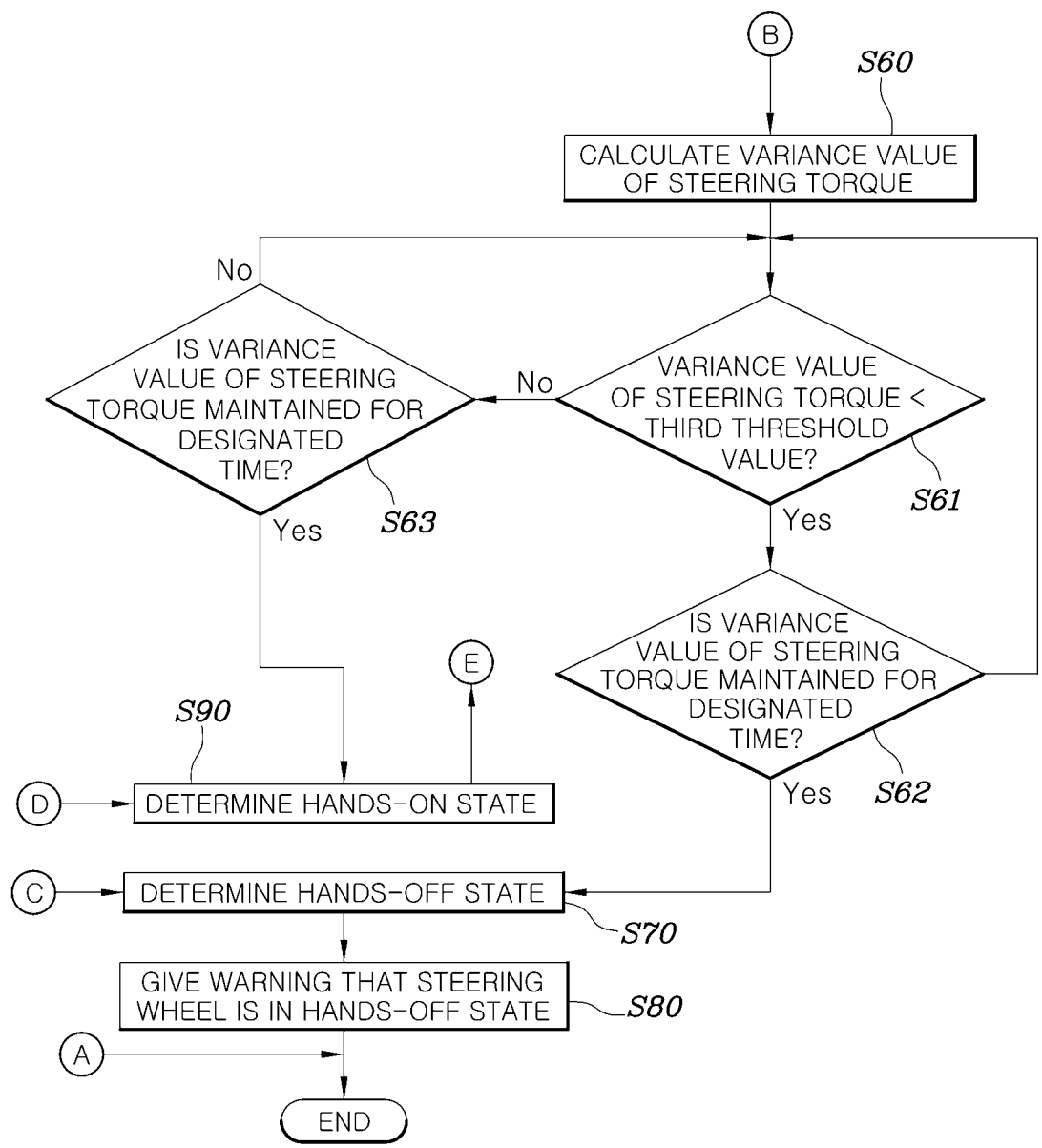

Referring to FIGS. 3A and 3B, a process for detecting the hands-off state of the steering wheel in accordance with various aspects of the present invention will be described. First, while driving of the vehicle, the controller CLR monitors whether or not the autonomous driving switch 20 is turned on (Operation S10).

In monitoring, if the autonomous driving mode switch 20 is turned on, the controller CLR receives a steering signal through the steering sensor 10, and detects steering torque, a steering angle and a steering angular speed (Operation S20).

Thereafter, the controller CLR determines a variance value of the steering angular speed using the above Equation 1 (Operation S30), and compares the determined variance value of the steering angular speed with the first threshold value (Operation S40).

As results of comparison in Operation S40, if the variance value of the steering angular speed is not less than the first threshold value, the controller CLR determines a difference value between steering angular speeds based on the steering system model and the steering sensor 10, as stated in the above Equation 2 (Operation S50).

Thereafter, the controller CLR compares the determined difference value between the measured and estimated steering angular speeds with the second threshold value (Operation S51), and, as results of comparison in Operation S51, if the difference value between the measured and estimated steering angular speeds is less than the second threshold value, the controller CLR determines whether or not a state in which the difference value between the measured and estimated steering angular speeds is less than the second threshold value is maintained for a designated time (Operation S52).

Thereafter, upon determining that the state in which the difference value between the measured and estimated steering angular speeds is less than the second threshold value is maintained for the designated time, the controller CLR determines that the steering wheel is in the hands-off state (Operation S70).

Thereafter, the controller CLR may control the display unit 30, such as the cluster, to give a warning that the steering wheel is in the hands-off state to the driver for a designated time (Operation S80), and then release the autonomous driving mode.

On the other hand, as results of comparison in Operation S51, if the difference value between the measured and estimated steering angular speeds is not less than the second threshold value, the controller CLR determines whether or not a state in which the difference value between the measured and estimated steering angular speeds is not less than the second threshold value is maintained for a designated time (Operation S53).

Thereafter, if the state in which the difference value between the measured and estimated steering angular speeds is not less than the second threshold value is maintained for the designated time, the controller CLR determines that the steering wheel is in the hands-on state (Operation S90).

On the other hand, as results of comparison in Operation S40, if the variance value of the steering angular speed is not less than the first threshold value, the controller CLR determines a variance value of the steering torque using Equation 3 above (Operation S60).

Thereafter, the controller CLR compares the determined variance value of the steering torque with the third threshold value (Operation S61), and, as results of comparison in Operation S61, if the variance value of the steering torque is less than the third threshold value, the controller CLR determines whether or not a state in which the variance value of the steering torque is less than the third threshold value is maintained for a designated time (Operation S62).

Thereafter, upon determining that the state in which the variance value of the steering torque is less than the third threshold value is maintained for the designated time, the controller CLR determines that the steering wheel is in the hands-off state (Operation S70).

Thereafter, the controller CLR may control the display unit 30, such as the cluster, to give a warning that the steering wheel is in the hands-off state to the driver for a designated time (Operation S80), and then release the autonomous driving mode.

On the other hand, as results of comparison in Operation S61, if the variance value of the steering torque is not less than the third threshold value, the controller CLR determines whether or not a state in which the variance value of the steering torque is not less than the third threshold value is maintained for a designated time (Operation S63).

Thereafter, if the state in which the variance value of the steering torque is not less than the third threshold value is maintained for the designated time, the controller CLR determines that the steering wheel is in the hands-on state (Operation S90).

As described above, in the system and method in accordance with various aspects of the present invention, the hands-on/off states of the steering wheel are detected using steering information detected by the steering sensor 10 without an additional sensor to detect the hands-on/off states of the steering wheel and thus production costs are reduced, and hands-on/off detection logic using the steering information is improved and thus hands-on/off detection performance is greatly improved.

Furthermore, the system and method in accordance with various aspects of the present invention solves misdetection of the hands-on state as the hands-off state due to detection of excessively small steering torque in the hands-on state, solves misdetection of the hands-off state as the hands-on state due to reaction force to a road surface in the hands-off state, and may thus improve robustness of the detection logic and solve user's dissatisfaction caused by such misdetection.

As is apparent from the above description, in a system and method for detecting a hands-off state of a steering wheel in accordance with various aspects of the present invention, the hands-on/off states of the steering wheel are detected using steering information detected by a steering sensor without an additional sensor to detect the hands-on/off states of the steering wheel and thus production costs are reduced, and hands-on/off detection logic using the steering information is improved and thus hands-on/off detection performance is greatly improved.

Furthermore, the system and method in accordance with various aspects of the present invention solves misdetection of the hands-on state as the hands-off state due to detection of excessively small steering torque in the hands-on state, solves misdetection of the hands-off state as the hands-on state due to reaction force to a road surface in the hands-off state, and may thus improve robustness of detection logic and solve user's dissatisfaction caused by such misdetection.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of detecting a hands-off state of a steering wheel, the method comprising:
   acquiring, by a controller, a steering torque, a steering angle and a steering angular speed while a vehicle is driven;
   determining, by the controller, a variance value of the steering angular speed through cumulation for a first predetermined time;
   determining, by the controller, a difference value between a steering angular speed estimated through a steering system model determined on assumption that the steering wheel is in the hands-off state and the steering angular speed measured by a steering sensor through cumulation for a second predetermined time, when the variance value of the steering angular speed is less than a first threshold value;
   divisionally determining, by the controller, when the steering wheel is in the hands-off state or in a hands-on state according to the difference value between the measured and estimated steering angular speeds;
   determining, by the controller, a variance value of the steering torque through cumulation for a fourth predetermined time, when the variance value of the steering angular speed is not less than the first threshold value; and
   divisionally determining, by the controller, when the steering wheel is in the hands-off state or in the hands-on state according to the variance value of the steering torque,
   wherein the variance value of the steering torque is determined by Equation 3:

$$v_r = \frac{\sum_{i=n}^{n-N}(\tau_i - \overline{\tau})^2}{N} \quad \text{[Equation 3]}$$

wherein $V\tau$ indicates the variance value of the steering torque, $\overline{\tau}$ indicates the steering torque, indicates torque average and N indicates a test time, and
   wherein the steering angular speed compensates for the steering torque generated by reaction force to a road surface to prevent the hands-off state from being falsely detected as the hands-on state when noise is generated from the steering sensor due to the road surface during the vehicle is driven in the hands-off state of the steering wheel.

2. The method according to claim 1, wherein, in divisionally determining when the steering wheel is in the hands-off state or in the hands-on state according to the difference value between the measured and estimated steering angular speeds, the controller is configured to:
   determine that the steering wheel is in the hands-off state, when the difference value between the measured and estimated steering angular speeds is less than a second threshold value; and
   determine that the steering wheel is in the hands-on state, when the difference value between the measured and estimated steering angular speeds is not less than the second threshold value.

3. The method according to claim 2, further including determining, by the controller, when the difference value between the measured and estimated steering angular speeds is maintained for a third predetermined time or longer than the third predetermined time.

4. The method according to claim 1, wherein the variance value of the steering angular speed is determined by Equation 1:

$$v_\theta = \frac{\sum_{i=n}^{n-N}(\theta_i - \overline{\theta})^2}{N}, \quad \text{[Equation 1]}$$

wherein $v_\theta$ indicates the variance value of the steering angular speed, $\dot\theta$ indicates the steering angular speed, $\overline{\dot\theta}$ indicates average of the steering angular speed and N indicates a test time.

5. The method according to claim 1, wherein the difference value between the measured and estimated steering angular speeds is determined by Equation 2:

$$\sum_{i=n}^{n-N} (\dot\theta_{h,i(model)} - \dot\theta_{h,i(measure)})^2, \qquad \text{[Equation 2]}$$

wherein $\dot\theta_{h,i(model)}$ the steering angular speed estimated through the steering system model determined on assumption that the steering wheel thereof is in the hands-off state, and $\dot\theta_{h,i(measure)}$ indicates the steering angular speed measured by the steering sensor.

6. The method according to claim 1, wherein the steering angular speed estimated through the steering system model is determined by:
setting up an equation of motion of the steering system model having the steering wheel provided at an upper end portion of a torsion bar, determined on assumption that the steering wheel is in the hands-off state;
setting up equations of state using the steering angle and the steering angular speed as quantities of state from the equation of motion; and
determining the steering angular speed estimated through the steering system model from the equations of state.

7. The method according to claim 1, wherein, in divisionally determining when the steering wheel is in the hands-off state or in the hands-on state according to the variance value of the steering torque, the controller is configured to:
determine that the steering wheel is in the hands-off state, when the variance value of the steering torque is less than a third threshold value; and
determine that the steering wheel is in the hands-on state, when the variance value of the steering torque is not less than the third threshold value.

8. The method according to claim 7, further including determining, by the controller, when the variance value of the steering torque is maintained for a fifth predetermined time or longer than the fifth predetermined time.

9. The method according to claim 1, further including:
determining, by the controller, when a current driving mode of the vehicle is in an autonomous driving mode; and
giving a warning about the hands-off state upon determining that the current driving mode of the vehicle is in the autonomous driving mode and that the steering wheel is in the hands-off state.

10. A system of detecting a hands-off state of a steering wheel, the system including:
a steering angular speed variance calculation unit configured to determine a variance value of a steering angular speed, detected by a steering sensor while a vehicle is driven, through cumulation for a first predetermined time;
a steering angular speed estimation unit configured to estimate a steering angular speed through a steering system model determined on assumption that the steering wheel is in the hands-off state;
a steering angular speed difference calculation unit configured to determine a difference value between the steering angular speed estimated through the steering system model and the steering angular speed measured by the steering sensor through cumulation for a second predetermined time, when the variance value of the steering angular speed is not less than a first threshold value; and
a hands-on/off determination unit configured to divisionally determine the hands-off state or a hands-on state of the steering wheel according to the difference value between the measured and estimated steering angular speeds; and
a steering torque variance calculation unit configured to determine a variance value of a steering torque through cumulation for a third predetermined time, when the variance value of the steering angular speed is less than the first threshold value,
wherein the hands-on/off determination unit divisionally determines the hands-off state or the hands-on state of the steering wheel according to the variance value of the steering torque,
wherein the variance value of the steering torque is determined by Equation 3:

$$v_r = \frac{\sum_{i=n}^{n-N}(\tau_i - \overline\tau)^2}{N}, \qquad \text{[Equation 3]}$$

wherein $V\tau$ indicates the variance value of the steering torque, $\overline\tau$ vindicates the steering torque, indicates torque average and N indicates a test time, and
wherein the steering angular speed compensates for the steering torque generated by reaction force to a road surface to prevent the hands-off state from being falsely detected as the hands-on state when noise is generated from the steering sensor due to the road surface during the vehicle is driven in the hands-off state of the steering wheel.

11. A system of detecting a hands-off state of a steering wheel, the system including a controller configured of:
acquiring a steering torque, a steering angle and a steering angular speed while a vehicle is driven;
determining a variance value of the steering angular speed through cumulation for a first predetermined time;
determining a difference value between a steering angular speed estimated through a steering system model determined on assumption that the steering wheel is in the hands-off state and the steering angular speed measured by a steering sensor through cumulation for a second predetermined time, when the variance value of the steering angular speed is less than a first threshold value;
divisionally determining when the steering wheel is in the hands-off state or in a hands-on state according to the difference value between the measured and estimated steering angular speeds;
determining, by the controller, a variance value of the steering torque through cumulation for a fourth predetermined time, when the variance value of the steering angular speed is not less than the first threshold value; and
divisionally determining, by the controller, when the steering wheel is in the hands-off state or in the hands-on state according to the variance value of the steering torque,
wherein the variance value of the steering torque is determined by Equation 3:

$$v_r = \frac{\sum_{i=n}^{n-N}(\tau_i - \bar{\tau})^2}{N},$$ [Equation 3]

wherein Vτ indicates the variance value of the steering torque, τ̄ indicates the steering torque, indicates torque average and N indicates a test time, and wherein the steering angular speed compensates for the steering torque generated by reaction force to a road surface to prevent the hands-off state from being falsely detected as the hands-on state when noise is generated from the steering sensor due to the road surface during the vehicle is driven in the hands-off state of the steering wheel.

12. The system according to claim 11, wherein, in divisionally determining when the steering wheel is in the hands-off state or in the hands-on state according to the difference value between the measured and estimated steering angular speeds, the controller is configured to:
   determine that the steering wheel is in the hands-off state, when the difference value between the measured and estimated steering angular speeds is less than a second threshold value; and
   determine that the steering wheel is in the hands-on state, when the difference value between the measured and estimated steering angular speeds is not less than the second threshold value.

13. The system according to claim 11, wherein the variance value of the steering angular speed is determined by Equation 1:

$$v_\theta = \frac{\sum_{i=n}^{n-N}(\dot{\theta}_i - \bar{\dot{\theta}})^2}{N},$$ [Equation 1]

wherein $v_\theta$ indicates the variance value of the steering angular speed, $\dot{\theta}$ indicates the steering angular speed, $\bar{\dot{\theta}}$ indicates average of the steering angular speed and N indicates a test time.

14. The system according to claim 11, wherein the difference value between the measured and estimated steering angular speeds is determined by Equation 2:

$$\sum_{i=n}^{n-N}(\dot{\theta}_{h,i(model)} - \dot{\theta}_{h,i(measure)})^2,$$ [Equation 2]

wherein $\dot{\theta}_{h,i(model)}$ indicates the steering angular speed estimated through the steering system model determined on assumption that the steering wheel thereof is in the hands-off state, and $\dot{\theta}_{h,i(measure)}$ indicates the steering angular speed measured by the steering sensor.

15. The system according to claim 11, wherein the steering angular speed estimated through the steering system model is determined by:
   setting up an equation of motion of the steering system model having the steering wheel provided at an upper end portion of a torsion bar, determined on assumption that the steering wheel is in the hands-off state;
   setting up equations of state using the steering angle and the steering angular speed as quantities of state from the equation of motion; and
   determining the steering angular speed estimated through the steering system model from the equations of state.

16. The system according to claim 11, further including:
   determining, by the controller, when the variance value of the steering torque is maintained for a fifth predetermined time or longer than the fifth predetermined time,
   wherein, in divisionally determining when the steering wheel is in the hands-off state or in the hands-on state according to the variance value of the steering torque, the controller is configured to:
   determine that the steering wheel is in the hands-off state, when the variance value of the steering torque is less than a third threshold value; and
   determine that the steering wheel is in the hands-on state, when the variance value of the steering torque is not less than the third threshold value.

* * * * *